US 7,474,951 B1

(12) United States Patent
Lenz et al.

(10) Patent No.: US 7,474,951 B1
(45) Date of Patent: Jan. 6, 2009

(54) PROCESS FOR AUTOMATIC DRIVE SLIP CONTROL (ASR)

(75) Inventors: Thomas Lenz, Lehrte (DE); Jörg Möllenhoff, Hannover (DE); Otmar Struwe, Ronnenberg (DE)

(73) Assignee: WABCO GmbH & Co. OHG, Hanover (DE)

(*) Notice: Subject to any disclaimer, the term of this patent is extended or adjusted under 35 U.S.C. 154(b) by 1826 days.

(21) Appl. No.: 09/618,853

(22) Filed: Jul. 18, 2000

(30) Foreign Application Priority Data

Jul. 22, 1999 (DE) ................................. 199 34 376

(51) Int. Cl.
*B60T 8/58* (2006.01)

(52) U.S. Cl. .......................... 701/82; 180/197; 303/91; 361/238

(58) Field of Classification Search .................... 701/82, 701/48, 83, 70, 71; 150/197; 50/197; 303/113.2, 303/113.4, 116.2, 192, 186, 110, 91; 180/197; 361/238
See application file for complete search history.

(56) References Cited

U.S. PATENT DOCUMENTS

| | | | | | |
|---|---|---|---|---|---|
| 4,861,118 | A | * | 8/1989 | Burckhardt et al. | 303/110 |
| 4,917,208 | A | * | 4/1990 | Komoda | 180/197 |
| 5,082,081 | A | * | 1/1992 | Tsuyama et al. | 180/197 |
| 5,127,501 | A | * | 7/1992 | Arikawa | 477/185 |
| 5,220,975 | A | * | 6/1993 | Zimmer et al. | 180/197 |
| 5,342,120 | A | * | 8/1994 | Zimmer et al. | 303/113.2 |
| 5,366,282 | A | * | 11/1994 | Schmitt et al. | 303/110 |
| 5,555,499 | A | * | 9/1996 | Yamashita et al. | 701/84 |
| 5,640,324 | A | * | 6/1997 | Inagaki | 701/70 |
| 5,752,752 | A | * | 5/1998 | Tozu et al. | 303/146 |
| 5,884,719 | A | * | 3/1999 | Schramm et al. | 180/197 |
| 5,947,221 | A | * | 9/1999 | Taniguchi et al. | 180/197 |
| 6,088,637 | A | * | 7/2000 | Acker et al. | 701/38 |
| 2001/0014844 | A1 | * | 8/2001 | Wandel | 701/82 |

FOREIGN PATENT DOCUMENTS

| | | | |
|---|---|---|---|
| DE | 41 21 747 | A | 1/1992 |
| DE | 41 22 345 | A | 1/1992 |
| DE | 195 38 545 | A1 | 4/1997 |
| DE | 195 45 013 | A1 | 6/1997 |
| DE | 195 48 564 | A1 | 6/1997 |
| DE | 196 01 529 | A1 | 7/1997 |
| DE | 196 03 677 | A | 8/1997 |
| DE | 19603677 | | 8/1997 |
| DE | 196 15 294 | A1 | 10/1997 |

OTHER PUBLICATIONS

WABCO Publication entitled Anti-Lock Braking System, ABS, with Integrated Drive Slip Control ASR For Commercial Vehicles, §§ 4.2.3-7.1 (1987).

* cited by examiner

*Primary Examiner*—Tuan C To

(57) ABSTRACT

A method for the control of the drive slip in a vehicle with rear wheel drive, particularly when traveling on difficult terrain or in deep snow, involves independent detection of wheel speeds of both the rear/drive wheels and the front/non-drive wheels. Dynamic values, such as wheel acceleration values, of the front wheels are used as a criterion for increasing the drive slip value of the ASR. The drive slip value of the rear wheels is increased if the difference between the dynamic values, e.g., acceleration values, determined for the front wheels exceeds a threshold value. The increased drive slip value of the drive wheels under the difficult travel conditions results in increased traction as well as increased available engine power.

9 Claims, 2 Drawing Sheets

PROCESS FOR AUTOMATIC DRIVE SLIP CONTROL (ASR)

BACKGROUND OF THE INVENTION

The invention relates to an improved process for automatic drive slip control in a vehicle with rear wheel drive.

Most of today's vehicles are equipped with an anti-lock brake system (ABS), as well as an automatic drive slip control (often referred to as Anti-Spin Regulation or ASR). The ABS/ASR may be part of a conventional braking system or part of an electronic braking system (EBS).

ABS/ASR systems are used to prevent locking or slipping of the wheels during braking or starting of a vehicle by limiting the slip of the wheels to an optimal desired value. For example, in a vehicle equipped with an ASR system, the permissible slip of the drive wheels is limited to a value of approximately 10%. In order to accomplish this, the wheel speeds of the vehicle are detected by means of rotational speed sensors which produce signals representative of the wheel speeds. The signals are transmitted to an electronic system where the signals are processed by means of suitably programmed microprocessors. The electronic system then transmits output signals to solenoid valves which control the brakes in order to influence the wheels which are beginning to lock or slip.

In a vehicle with a known ASR system where only one of the drive wheels is slipping, only the drive wheel which is slipping is braked. As a result, torque is transmitted via a differential gear on the drive axle to the other wheel on the drive axle. However, if both drive wheels are slipping, the ASR additionally lowers the engine speed or engine power to prevent further slippage. A more detailed description of such a known ABS/ASR system is contained, for example, in the WABCO publication entitled: "Das integrierte Sicherheitssystem für Nutzfahrzeuge, Anti-Blockier-System ABS mit Antriebs-Schlupf-Regelung ASR" ("Anti-lock Brake System ABS With Integrated Drive Slip Control ASR For Commercial Vehicles"), March 1987, §§5-5.3, which is incorporated herein by reference.

It is especially difficult for the ASR system to operate properly during starting and continued travel in difficult terrain, e.g., in deep snow or slush. If both drive wheels slip and the engine power is lowered, this reduced engine power may no longer be sufficient to drive the vehicle. In this case, one could imagine to manually increase the normal ASR slip value of the drive wheels by an operator-actuated push-button ("ASR push-button").

A further method to adapt the ASR slip value automatically to different road conditions and frictional coefficient values of the road is disclosed, for example, in DE-A1 196 03 677. In this case, the ASR slip value is increased on roads with high coefficient of friction values so that the acceleration of the vehicle can thereby be increased.

In this known method, the ASR slip value is increased when excessive fluctuations in dynamic values, e.g., the wheel speeds, of the wheels on the drive axle occur. To accomplish this, a control system is provided which recognizes high-frequency, low amplitude oscillations in the wheels by evaluating the accelerations of the drive wheels. However, the method described in DE-A1 196 03 677 does not take into account the extreme road conditions noted above. With this known method, the ASR slip value can be varied by approximately between 5% and 20% where the higher slip values are used for more adherent road surfaces.

A disadvantage to this method is that the high-frequency oscillations of the drive wheels may occur independently so that the ASR slip value may be influenced thereby in an undesirable manner. This is especially true for vehicles with inserted axles.

It is an object of the present invention to provide a method for improved traction of a vehicle traveling in deep snow or other difficult types of terrain.

SUMMARY OF THE INVENTION

In accordance with this and other objects of the invention, there is provided a method for a reliable increase of the drive slip value obtained when traveling through deep snow or on difficult terrain, independently of vehicle or axle type or load condition. This method is applicable to a vehicle having rear wheel drive and comprises determining dynamic values associated with the wheels on the front (non-drive) axle, and if the difference in these dynamic values exceeds a threshold value, automatically increasing the ASR drive slip value for the wheels on the rear (drive) axle. When the vehicle leaves or is no longer traveling on this difficult terrain, the ASR slip value is automatically lowered back to its normal value. As has been shown in test drives, the increased ASR drive slip value of the drive wheels under the difficult travel conditions described above cause the traction as well as the available engine power to be sufficiently increased.

In accordance with an embodiment of the present invention, due to the automatic detection of the road conditions and the corresponding adaptation of the ASR control, manual intervention by the driver, e.g., actuation of an ASR push-button, is unnecessary. In accordance with the present invention, improved vehicle stability is achieved and maintained.

In order to recognize the difficult types of terrain over which the vehicle may be traveling, the dynamic behavior of the wheels on both the front and rear axles is determined, as opposed to the previously known method where only the dynamic behavior of the rear wheels is determined. It was shown in test drives through precise evaluation that the acceleration values of the front wheels are especially increased when driving through deep snow (snow depth >10 cm). This is because during deep snow operation, snow wedges repeatedly build up for brief times in front of the front wheels. The snow wedges are then compressed and driven over. The increased fluctuations in the measured dynamic values of the front wheels are thus used as a criterion for the increase of the drive slip value of the ASR in accordance with an embodiment of the present invention.

DETAILED DESCRIPTION OF THE INVENTION

Figure 1:
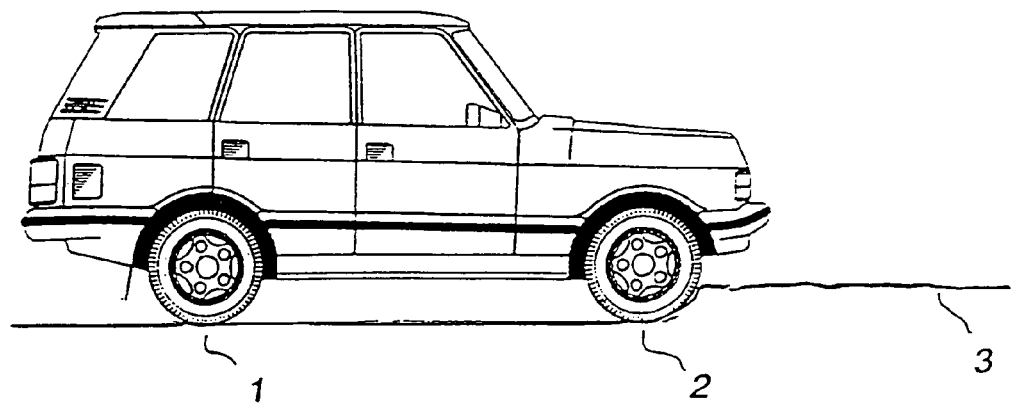
FIG. 1 shows a vehicle traveling in deep snow.

FIG. 1 shows a rear-wheel drive vehicle having a drive rear axle 1 and a non-drive front axle 2 traveling through deep snow 3. In this example, the snow depth is approximately 20 cm and the snow may already be packed down. Under such driving conditions it may occur, especially on an incline, that one or both wheels of the rear drive axle 1 tend to slip. This may cause the built-in ASR system to act by braking the slipping wheel on the drive axle or lowering the engine power.

Figure 2:
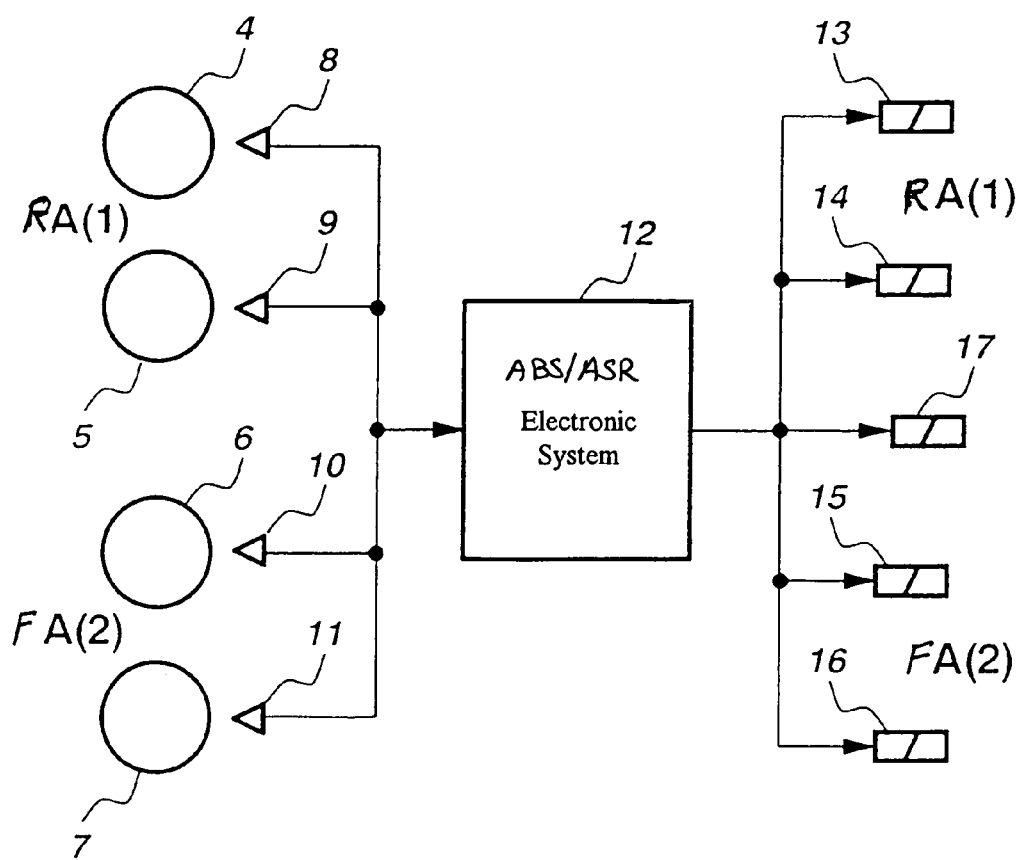
FIG. 2 is a schematic diagram of the ABS/ASR system according to the present invention.

The ABS/ASR system is shown schematically in FIG. 2. The speeds of the wheels 4 and 5 on the rear axle (RA) 1 are scanned by rotational speed sensors 8 and 9, respectively. Similarly, the wheels 6 and 7 of the front axle (FA) 2 are scanned by rotational speed sensors 10 and 11, respectively. The rotational speed signals of all four wheels are then transmitted to the ABS/ASR electronic system 12. The ABS/ASR electronic system is a standard device known to one skilled in the art and will therefore not be described in detail.

The information on the speeds of the four wheels is converted into actuating signals within the electronic system 12 which are to be transmitted to solenoid valves 13, 14, 15 and 16. These valves are inserted into the brake lines of the individual wheels and serve to either lower the braking action (for ABS operation) or to apply braking forces to individual slipping drive wheels (for ASR operation).

In the ASR operation discussed here, the brake cylinder of the rear wheel 4 or 5, i.e., the drive wheel, which tends to slip is subjected to braking pressure and the wheel is thereby decelerated. The slip of the slipping wheel is then controlled by the ASR electronic system and brought to an appropriate value which depends on the road conditions. Thus, an increased torque is transmitted via the differential gear of the rear axle in a known manner to the non-slipping drive wheel.

If the slipping wheel exceeds a speed limit, or if both drive wheels slip, the engine power is lowered automatically by the ASR electronic system via an actuating element 17 acting on the gas pedal.

According to the present invention, the ABS/ASR electronic system 12 has an additional circuit element or program segment of its microprocessors which determines the dynamic behavior of the wheels 6 and 7 of the front axle 2. Advantageously, this is done by evaluating the acceleration values of the front wheels 6 and 7. When the difference between the accelerations of the two front wheels (i.e., the non-drive wheels) exceeds a predetermined limit, the normal drive slip value for the rear drive wheels is increased by the electronic system 12. The increased ASR drive slip value may be up to 50% above its normal value, further depending upon the vehicle's speed. As previously noted, safer travel and greater engine power is thereby made possible during ASR operation in deep snow or other difficult terrain.

According to the present invention, the increase in the drive slip value is only carried out when no high frequency torsional oscillations with a typical frequency of 5-8 Hz are occurring in the drive wheels 4 and 5 of the rear axle 1. These oscillations are recognized when the median wheel accelerations of the wheels 4 and 5 of the rear axle 1 exceeds a predetermined limit value. As recognized by the test driver, those high frequency oscillations of the drive wheels may be transmitted to the front wheels 6 and 7 and thereby the detection of the dynamic behavior of the front wheels can become distorted. As a result, an unnecessary change in the drive slip value can occur.

It is advantageous to increase the drive slip valve only if the vehicle is not in a turn. This increases travel stability and safety, which is preferred over traction in this case. Travel in a curve may be detected by comparing the wheel speeds.

It is also advantageous to limit the increase of the drive slip value as a function of vehicle speed. This also increases travel stability and safety.

Furthermore, the gradient at which the drive slip value is increased can be changed as a function of various criteria. These criteria may include, for example, current vehicle speed, vehicle acceleration and the position of the accelerator. This can serve to improve traction even faster when it is necessary.

Figure 3:
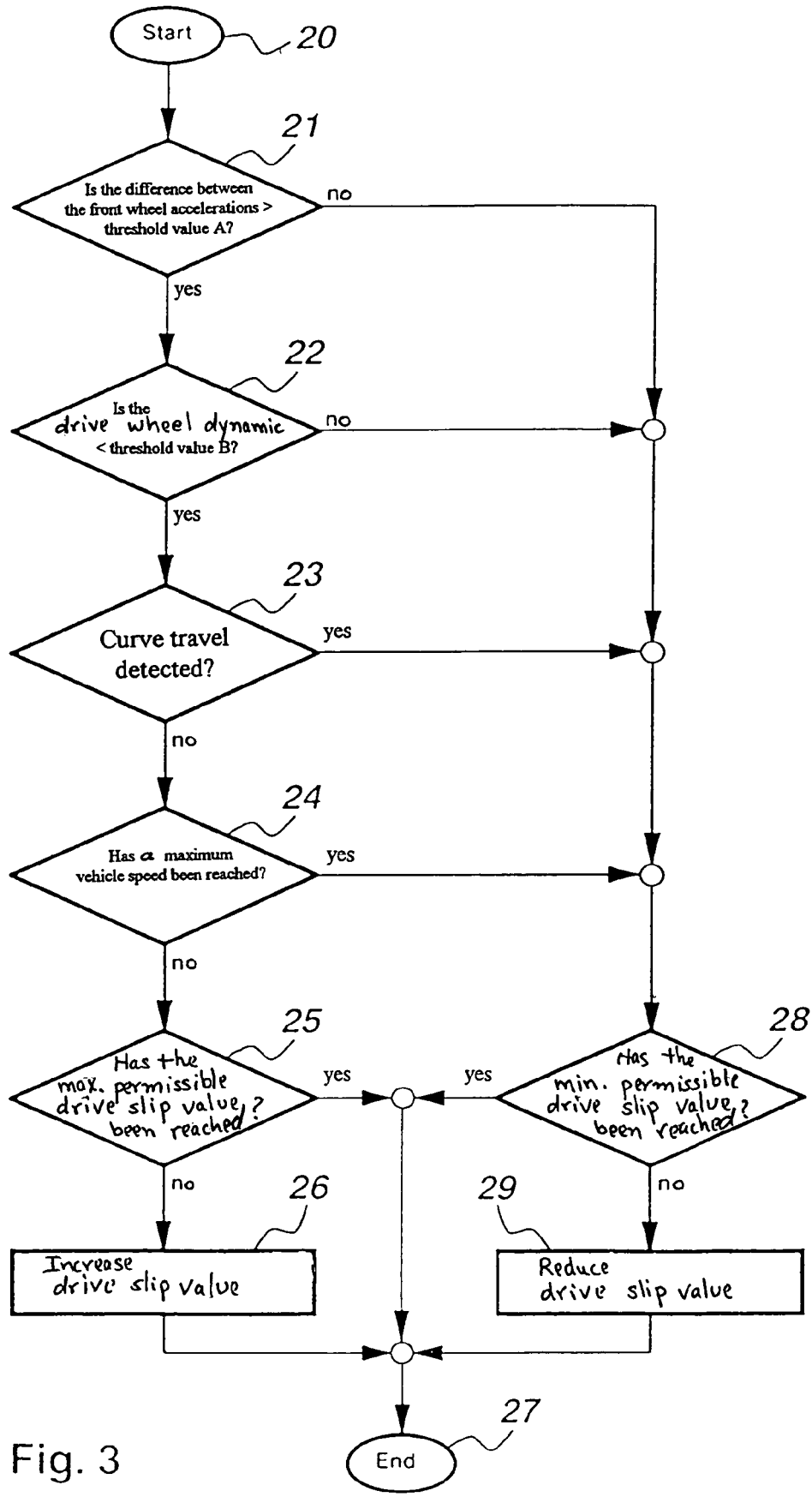
FIG. 3 is a flow chart of the process of the ABS/ASR system according to the present invention.

Turning now to FIG. 3, a flow chart is presented which shows the process programmed into microcontrollers inside the ABS/ASR electronic system 12 of FIG. 2. The ABS/ASR electronic system goes through the flow chart cyclically as through an auxiliary program for as long as the vehicle travels in ASR operation.

After the start 20 of the sub-program, a determination is made in decision block 21 whether the difference in acceleration values between the front wheels is greater than a threshold value A.

If this difference is greater than the threshold value A, a determination is made in decision block 22 whether the wheel dynamic of the rear wheels is lower than a threshold value B. This step prevents increasing the drive slip value when the previously mentioned high frequency oscillations occur in the rear wheels.

If this difference is lower than the threshold value B, a determination is made in decision block 23 whether the vehicle is traveling in a curve.

If the vehicle is not traveling in a curve, a determination is made in decision block 24 whether a maximum vehicle speed has been reached. This step prevents increasing the drive slip value if the vehicle is traveling too fast.

If a maximum vehicle speed has not been reached, a determination is made in decision block 25 whether a maximum permissible slip value has been reached.

If the maximum permissible slip value has not been reached, the slip value is increased from its current value as shown in block 26, and the program ends as shown in block 27.

However, if the difference in acceleration between the front wheels is less than the threshold value A (decision block 21), the wheel dynamic of the drive wheels is greater than the threshold value B (decision block 22), travel in a curve is detected (decision block 23), or a maximum vehicle speed has been reached (decision block 24), a determination is made in decision block 28 whether a minimum value for the drive slip has been reached. If the minimum value has not been reached, the drive slip value is reduced as shown in block 29, and the program ends as shown in block 27.

If the maximum permissible drive slip value has been reached as determined in decision block 25, or the minimum permissible drive slip value has been reached as determined in decision block 28, the program ends as shown in block 27.

The method according to the present invention described herein applies to rear-wheel drive vehicles but is also applicable to all-wheel drive vehicles where the front wheel drive is switched off.

Having described preferred embodiments of the invention with reference to the accompanying drawing, it is to be understood that the invention is not limited to those precise embodiments, and that various changes and modifications may be effected therein by one skilled in the art without departing from the scope or spirit of the invention as defined in the appended claims.

What is claimed is:

1. In a vehicle equipped with an ASR system and operating in a rear wheel drive mode, a method for adjusting the normal drive slip value of the ASR system, comprising
   (a) evaluating dynamic values associated with the front wheels of the vehicle, and
   (b) if the dynamic values associated with the front wheels exceed a threshold value, increasing the normal drive slip value of the rear wheels.

2. The method of claim 1 wherein the dynamic values evaluated in step (a) comprise acceleration values for each of the front wheels.

3. The method of claim 2 wherein if the difference between the front wheel acceleration values exceeds a given threshold, the normal drive slip value of the rear wheels is increased.

4. The method of claim 1 further comprising determining whether high frequency oscillations are occurring in the rear wheels, and if so, not increasing the normal drive slip values of the rear wheels.

5. The method of claim 1 further comprising determining whether the vehicle is traveling in a curve, and if so, not increasing the normal drive slip value of the rear wheels.

6. The method of claim 1 wherein the increase of the normal drive slip value is limited in dependence on the current vehicle speed.

7. The method of claim 1 wherein the rate at which the normal drive slip value is increased depends on the current vehicle speed.

8. The method of claim 1 wherein the rate at which the normal drive slip value is increased depends on the vehicle acceleration.

9. The method of claim 1 wherein the rate at which the normal drive slip value is increased depends on the position of the accelerator of the vehicle.

* * * * *